(12) United States Patent
Ortner et al.

(10) Patent No.: US 12,318,869 B2
(45) Date of Patent: Jun. 3, 2025

(54) METHOD OF STRUCTURING A GLASS ELEMENT AND STRUCTURED GLASS ELEMENT PRODUCED THEREBY

(71) Applicant: SCHOTT AG, Mainz (DE)

(72) Inventors: Andreas Ortner, Gau-Algesheim (DE); Fabian Wagner, Mainz (DE); Markus Heiss-Chouquet, Bischofsheim (DE); Annika Hörberg, Mainz (DE); Michael Drisch, Mainz (DE); Vanessa Glässer, Mainz (DE); Lukas Walter, Oestrich-Winkel (DE); Andreas Koglbauer, Trebur (DE); Lars Müller, Wiesbaden (DE); David Sohr, Mainz (DE); Bernd Hoppe, Ingelheim (DE); Michael Kluge, Offenbach am Main (DE)

(73) Assignee: SCHOTT AG, Mainz (DE)

( * ) Notice: Subject to any disclaimer, the term of this patent is extended or adjusted under 35 U.S.C. 154(b) by 621 days.

(21) Appl. No.: 17/546,724

(22) Filed: Dec. 9, 2021

(65) Prior Publication Data

US 2022/0176494 A1    Jun. 9, 2022

(30) Foreign Application Priority Data

Dec. 9, 2020    (EP) .................................... 20212702

(51) Int. Cl.
  *C03B 33/02*    (2006.01)
  *B23K 26/0622*    (2014.01)
  (Continued)

(52) U.S. Cl.
  CPC ........ *B23K 26/362* (2013.01); *B23K 26/0622* (2015.10); *C03B 33/0222* (2013.01); *B23K 2103/54* (2018.08)

(58) Field of Classification Search
  CPC .................................................. C03B 33/0222
  See application file for complete search history.

(56) References Cited

U.S. PATENT DOCUMENTS

| 6,857,449 B1 | 2/2005 | Chow |
| 8,173,038 B2 | 5/2012 | Wagner |

(Continued)

FOREIGN PATENT DOCUMENTS

| CN | 103992948 | 11/2016 |
| DE | 102011085371 | 5/2013 |

(Continued)

*Primary Examiner* — Cynthia Szewczyk
(74) *Attorney, Agent, or Firm* — Ruggiero McAllister & McMahon LLC

(57) ABSTRACT

A method of structuring a glass element having a first side face and a second side face is provided. The method includes the steps of: producing a filament-shaped flaw in the glass element with a pulsed laser beam along a focus line; etching to remove glass in the filament-shaped flaw to form a wall extending from the first side face towards the second side face, the wall having a boundary line that is tapered at a vertex between the wall and the first side face with a taper angle with respect to a perpendicular of the first side face; and adjusting the taper angle by controlling a feature of the focus line. The feature is selected from a group consisting of a position of the focus line, a length of the focus line, an intensity distribution of the focus line, and any combinations thereof.

22 Claims, 8 Drawing Sheets

(51) Int. Cl.
    *B23K 26/362*      (2014.01)
    *B23K 103/00*      (2006.01)

(56) References Cited

U.S. PATENT DOCUMENTS

| | | | |
|---|---|---|---|
| 2001/0028390 A1* | 10/2001 | Hayashi | B23K 26/048 |
| | | | 347/262 |
| 2003/0235385 A1 | 12/2003 | Taylor | |
| 2009/0013724 A1 | 1/2009 | Koyo | |
| 2010/0025387 A1 | 2/2010 | Aria | |
| 2011/0207323 A1 | 8/2011 | Ditizio | |
| 2013/0061961 A1 | 3/2013 | Rapp | |
| 2013/0126573 A1* | 5/2013 | Hosseini | B23K 26/0006 |
| | | | 225/2 |
| 2015/0140735 A1 | 5/2015 | Hosseini | |
| 2015/0165563 A1 | 6/2015 | Manley | |
| 2015/0166395 A1 | 6/2015 | Marjanovic | |
| 2016/0031745 A1 | 2/2016 | Ortner | |
| 2016/0199944 A1 | 7/2016 | Hosseini | |
| 2017/0256422 A1 | 9/2017 | Ambrosius | |
| 2018/0127701 A1 | 5/2018 | Zhang | |
| 2018/0134604 A1 | 5/2018 | Ortner | |
| 2019/0329251 A1 | 10/2019 | Ortner | |
| 2020/0101561 A1 | 4/2020 | Ortner | |
| 2020/0235020 A1 | 7/2020 | Boek | |
| 2020/0376603 A1 | 12/2020 | Ortner | |

FOREIGN PATENT DOCUMENTS

| | | |
|---|---|---|
| DE | 102013103370 | 10/2014 |
| DE | 10214113339 | 3/2016 |
| DE | 102015116848 | 4/2017 |
| DE | 102017208290 | 11/2018 |
| DE | 102018126381 | 8/2019 |
| EP | 2503859 | 9/2012 |
| EP | 2719460 | 4/2014 |
| EP | 3037826 | 6/2016 |
| EP | 3088076 | 11/2016 |
| EP | 2547618 | 4/2017 |
| EP | 2931467 | 6/2017 |
| JP | 2013-188677 | 9/2013 |
| WO | 2012006736 | 1/2012 |
| WO | 2017009379 | 1/2017 |
| WO | 2018217696 | 11/2018 |
| WO | 2020224706 | 11/2020 |

\* cited by examiner

METHOD OF STRUCTURING A GLASS ELEMENT AND STRUCTURED GLASS ELEMENT PRODUCED THEREBY

CROSS REFERENCE TO RELATED APPLICATIONS

This application claims benefit under 35 USC § 119 of European Application EP 20 212 702.3 filed Dec. 9, 2020, the entire contents of which are incorporated herein by reference.

BACKGROUND

1. Field of Invention

The invention relates in general to a method of structuring a glass element. Further aspects of the invention relate to a structured glass element, in particular a glass element produced or producible by the method according to embodiments of the invention, and the use of such a glass element. In particular, the invention relates to a method for structuring a glass element using a pulsed laser beam of an ultrashort pulse layer, and to glass elements produced or producible by such a method, as well as their use.

2. Description of Related Art

Methods for processing workpieces using an ultrashort pulse layer are frequently employed, for example, in order to prepare a workpiece for separation.

For example, WO 2012/006736 A2 discloses a method for preparing a substrate for separation by using an ultrashort pulse laser, i.e., a laser with pulse lengths shorter than 100 ps. In the method disclosed by WO 2012/006736 A2, several spaced apart filaments are produced along an intended separation line, exploiting a nonlinear effect of self-focusing.

WO 2017/009379 A1 describes a further development of the method of WO 2012/009736 A2. In the method according to WO 2017009379 A1, modifications are produced in the workpiece extending obliquely to the surfaces of the processed substrate. This is achieved by directing the laser pulses obliquely onto the surface of the respective workpiece.

From EP 2 931 467 B1 it is known to include the ambient atmosphere as a further process parameter in order to prevent premature self-cleaving due to subcritical crack growth.

Furthermore, DE 10 2015 116 848 A1 describes the introducing of a zone of defined strength by producing a filament using spherical aberration of a lens in which the Gaussian beam of the ultra-short pulsed laser is converted into a line focus with uneven intensity distribution along the optical axis.

Further, DE 10 2018 126 381 A1 relates to a method for introducing a separation line into a transparent brittle material and an element thus obtained.

However, all these methods are directed towards separating a workpiece. That is, several material modifications are generated in a workpiece using an ultrashort pulse layer, wherein the modifications are arranged along a predefined path along an intended separation line. Preferably, the material modifications lead to holes formed within the workpiece. Separation may then advantageously be achieved by exposing the workpiece to an etching medium or etching bath so that the holes are widened until adjacent holes or channels combine. In that way, the workpiece may be separated along the predefined path of material modifications (or filaments) formed in the workpiece.

However, for several applications, it may be preferred to structure a glass element rather than separate it, for example if the glass element is used as an interposer. Further, known methods for producing filaments that are at an oblique angle to the surfaces of the workpiece require extensive process control in order to adjust and monitor, for example, laser parameters and/or workpiece positioning very precisely, for example, by providing special focusing optics that may compensate for astigmatic deformation of the beam profile.

Therefore, there is a need for a process as well as glass elements thus producible that overcome the drawbacks of the state of the art at least partially.

SUMMARY

It is an object of the present invention to provide for a method of structuring a glass element that overcomes known drawbacks of the state of the art, that is, methods requiring extensive process control, at least partially. A further aspect of the present invention is directed towards a structured glass element as well as to the use of such a glass element.

The invention therefore relates to a method of structuring a glass element. According to this structuring method, a pulsed laser beam of an ultrashort pulse laser is directed onto the glass element. The glass element is transparent for the laser beam and at least one filament-shaped flaw is produced in the glass element, the filament-shaped flaw extending transversely to the side faces of the glass element. The filament-shaped flaw is produced with a laser beam that is concentrated by means of a focusing optics to form a focus line in the glass element, wherein the intensity of the laser beam within the focus line is sufficient to produce the filament-shaped flaw. The focus line is adjusted so that the filament shaped flaw ends within the glass element. The glass element is exposed to an etching medium or an etching bath which removes glass by etching, so that the filament-shaped flaw widens to form a wall extending between the opposite side faces of the glass element, the wall having a boundary line that is tapered at the vertex between the wall and an adjacent side face, with a taper angle with respect to the perpendicular of the side face, the taper angle being adjusted by at least one of the position, the length and the intensity distribution of the focus line. These parameters can be combined to adjust the geometry of the filament shaped flaws, such as the depth of a flaw in form of a blind hole.

Such a method offers several advantages.

According to the method of the present disclosure, a structured glass element is obtained, wherein a filament-shaped flaw is formed that ends within the glass element. In a further process step, this filament-shaped flaw is widened by use of an etching medium or etching bath to form a wall extending between the opposite side faces of the glass element. In other words, by etching, a hole is obtained within the glass element, this hole follows the form of the previously formed filament-shaped flaw at least essentially. As the filament-shaped flaw ends within the glass element, therefore, a blind hole is obtained within the glass element.

Here, the expression "the hole following the form of the flaw at least essentially" is understood to mean that the hole extends along the length of the previous filament-shaped flaw and is therefore formed as an elongate hole but may, however, be wider and longer than the flaw itself.

The filament-shaped flaw extends transversely to the side faces, that is, the filament-shaped flaw and the side faces of the glass element draw an angle. In other words, the filament-shaped flaw is not parallel to either side face of the glass element. Preferably, the flaw may draw a right angle with at least one of the side faces of the glass element or may be oriented essentially perpendicular to at least one of the side faces of the glass element. Here, "being oriented at least essentially perpendicular" is understood to mean that the flaw and the normal of the respective side face draw an angle of not more than ±5°.

However, and quite surprisingly, upon etching of the glass element in order to widen the filament-shaped flaw so that a wall (or a hole with a wall) is formed within the glass element, a wall (or hole having a wall) is obtained with a tapering boundary line. That is, the hole is at an oblique angle to at least one of the side faces. In particular, the angle drawn between the flaw and a side face may differ from the angle drawn between the hole (or the boundary line of the wall of the hole).

This may achieved quite surprisingly by adjusting at least one the position and/or the intensity distribution of the focus line of the laser beam. However, controlling the position of the substrate orientation relative to the laser beam very precisely, for example, by providing supplemental optical devices such as a cylindrical lens or the like is not necessary. The disclosure therefore provides a simple process for forming structured glass elements having at least one blind hole formed within the glass element, wherein the boundary line of the wall of the hole the side face of the glass elements to which the hole opens draw an oblique angle.

In the scope of the present invention, the following definitions apply:

A filament is understood to refer to an elongate structure, that is, a structure with a dimension along a first direction of a Cartesian coordinate system that is greater by at least one order of magnitude than the dimensions of the structure along the two further directions of the Cartesian coordinate system that are perpendicular to the first direction.

A flaw may, according to the present disclosure, be understood as an altered region within a workpiece (or glass element). That is, in the region the properties differ from that of the workpiece (or glass element) prior to forming the flaw.

A filament-shaped flaw therefore may be understood as an altered, elongate region within the glass element.

A plate-shaped element (or body) is understood to refer to a body whose dimension along a first direction of a Cartesian coordinate system is smaller by one order of magnitude than the dimensions along the two further directions of the Cartesian coordinate system perpendicular to the first direction. For example, a plate shaped glass element may also be denoted a glass plate or a glass ribbon. The plate-shaped element according to the disclosure may be formed as a flat or bend element. Further, in case of a flat element, the side faces may preferably be essentially parallel to each other, that is, the normals or perpendiculars of the side faces drawing an angle of preferably not more than 10°, in particular not more than 5°.

An ultrashort pulse laser is understood as a laser with a pulse length not more than 100 ps. Preferably, pulse lengths are not longer than 10 ps, more preferably not longer than 1 ps or even smaller than 1 ps.

According to an embodiment, a channel is produced by etching and widening of the filament-shaped flaw, wherein the channel opens to both opposite side faces. That is, with other words, a through hole is formed according to an embodiment. Such an embodiment may be advantageous in case the glass element is used as an interposer, for example, in printed circuit applications.

According to a further development, a filament-shaped flat is produced that ends in the glass element by using a focusing optics which superimposes at least two partial beams of the laser beam so that the interference of the partial beams generates an intensity variation along the focus line. This is a very simple, yet effective way to generate a flaw (or material modification) in a workpiece. In this respect, the flaw may also be referred to as a "blind flaw". Further, upon superimposing the two partial beams, thereby generating an intensity variation along the focus line, the resulting angle between the side face of the glass element and the boundary line of the wall may be adjusted in a very simple way.

According to an embodiment, a multitude of filament-shaped flaws that are distributed over the glass element in a predefined pattern are produced. Further, these filament-shaped flaws may, upon etching, be formed by widening of the flaws. In this way, a multitude of channels that correspond to the previously produced flaws within the glass element and that are distributed over the glass element in a predefined pattern are produced.

The disclosure further relates to a glass element, in particular a glass element that is produced or at least producible with a method according to an embodiment of the disclosure, preferably a plate-shaped glass element. The glass element comprises two opposite side faces and a multitude of etched channels that extend through the glass element so that the walls of the channels connect the side faces. The boundary lines of the channel walls are tapered at the vertices between the wall and the adjacent side faces. Preferably, at least two taper angles between the boundary lines and the perpendicular of the side faces at the vertices between the walls and the side face differ from each other.

BRIEF DESCRIPTION OF FIGURES

FIG. 6a schematically depicts a laser beam along a beam direction.

FIG. 6b schematically depicts a side view of the laser beam of FIG. 6a.

DETAILED DESCRIPTION

Figure 1:
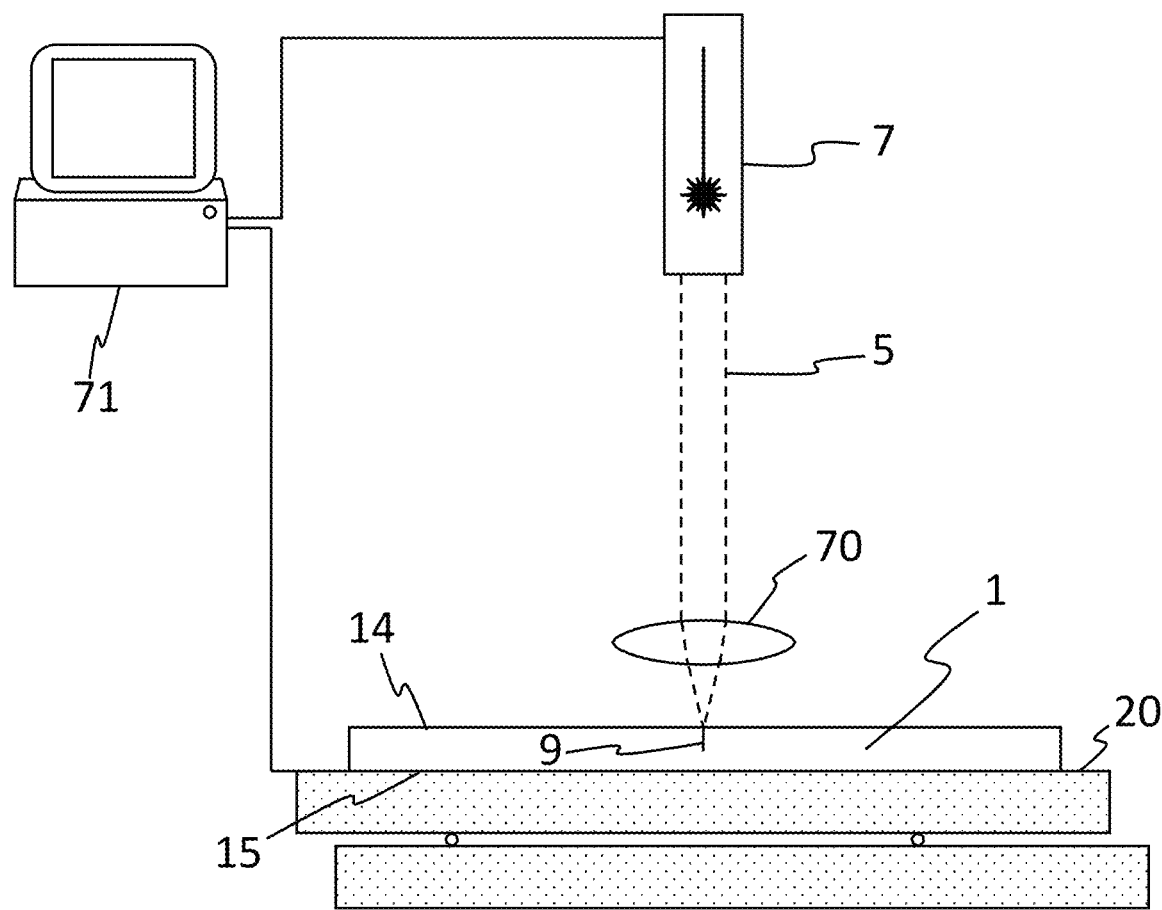
FIG. 1 shows schematically the structuring of a glass element according to the method of the disclosure.

The invention will now be further explained with reference to the figures. In the figures, like reference numerals refer to the same or corresponding elements.

FIG. 1 shows schematically and not drawn to scale the structuring of a glass element according to the method of the disclosure. Using an ultrashort pulse laser 7, pulsed laser beam 5 is generated and directed onto glass element 1. Glass element 1 is transparent for laser beam 5. Here, glass element 1 is a plate shaped, even glass element, however, it is to be understood that according to the disclosure, any glass element may be structured, for example, a plate shape, bend glass element. Glass element 1 has two side faces 14, 15. Side faces may be understood in the scope of the disclosure as relating to principal faces of a body, that is, surfaces that together make up more than 50% of the total of the surface of the respective body.

Further, apart from glass elements, workpieces comprising or consisting of materials other than glass may also be structured by the method of the disclosure.

At least one filament shaped, that is elongated, flaw 9, for example a material modification, is produced in glass element 1. Flaw 9 extends transversely to side faces 14, 15 of glass element 1, that is, an angle is drawn between flaw 9 and either of side faces 14, 15. In other words, flaw 9 is not parallel to either of side faces 14, 15.

Laser beam 5 used to produce flaw 9 is concentrated by means of focusing optics 70 to form focus line 8 (not shown here) in glass element 1. The intensity of laser beam 5 within focus line 8 (not shown here) is sufficient to produce filament-shaped flaw 9. Furthermore, focus line 8 (not shown here) is adjusted so that filament-shaped flaw 9 ends within glass element 9.

FIG. 1 further depicts positioning means 20 and computing means 71. Computing means 71 may be used to adjust the power output of laser 5 and/or to control the position of glass element 1 by controlling position means 20. Positioning means 20 may advantageously be employed in case a multitude of filament-shaped flaws 9 are to be produced in glass element 1, for example along a predefined path. However, it is of course possible to use several computing means 71.

Figure 2:
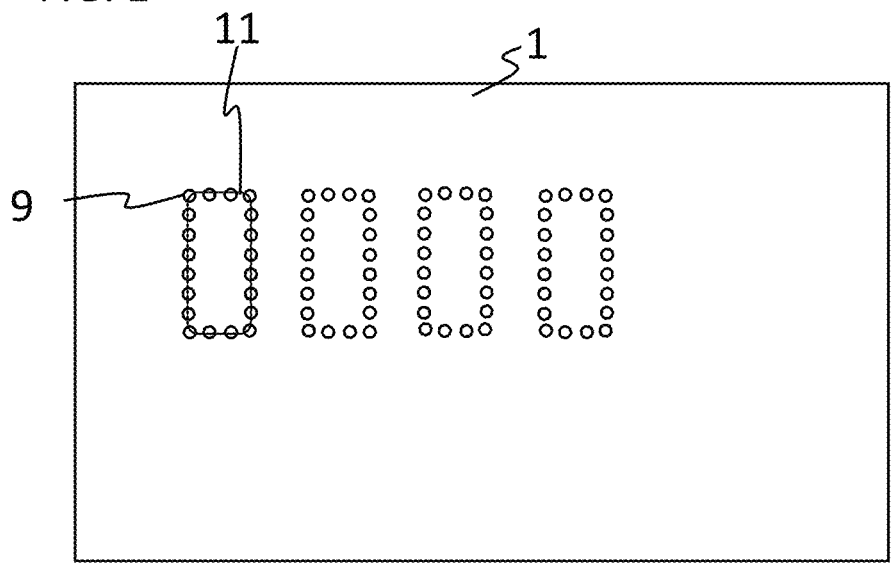
FIG. 2 depicts schematically a glass element according to the disclosure.

FIG. 2 depicts schematically and not drawn to scale glass element 1 according to an embodiment. Here, a multitude of filament-shaped flaws 9 are generated within glass element 1 by advancing laser beam 5 relative to glass element 1 along predefined path 11. In that way, a multitude of flaws 9 results that are arranged side-by-side along path 11, that is, in a predefined pattern. The predefined pattern may be a grid, or a sequence of flaws forming a circle or ellipsoid or any other suitable shaped, for example, a spiral shape. As has already been explained with respect to FIG. 1 depicting positioning means 20, advancing laser beam 5 along path 11, thus resulting in forming a multitude of flaws 9 distributed over glass element 1 in a predefined pattern may be achieved by positioning means 20.

Figure 3:
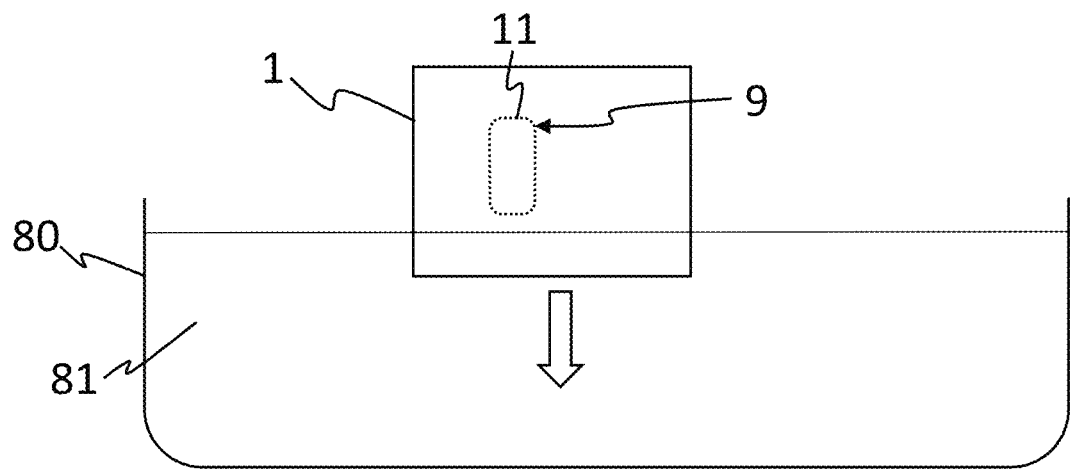
FIG. 3 schematically depicts a glass element exposed to an etching bath according to the disclosure.
Figure 12:
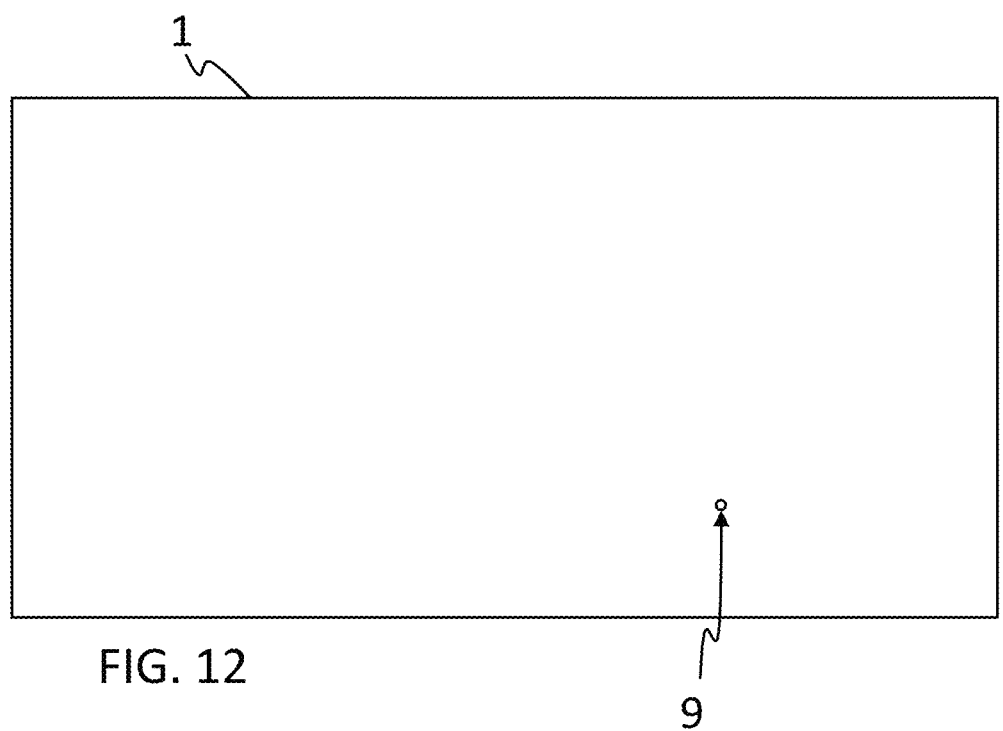
FIG. 12 depicts schematically a glass element according to the disclosure.
Figure 13:
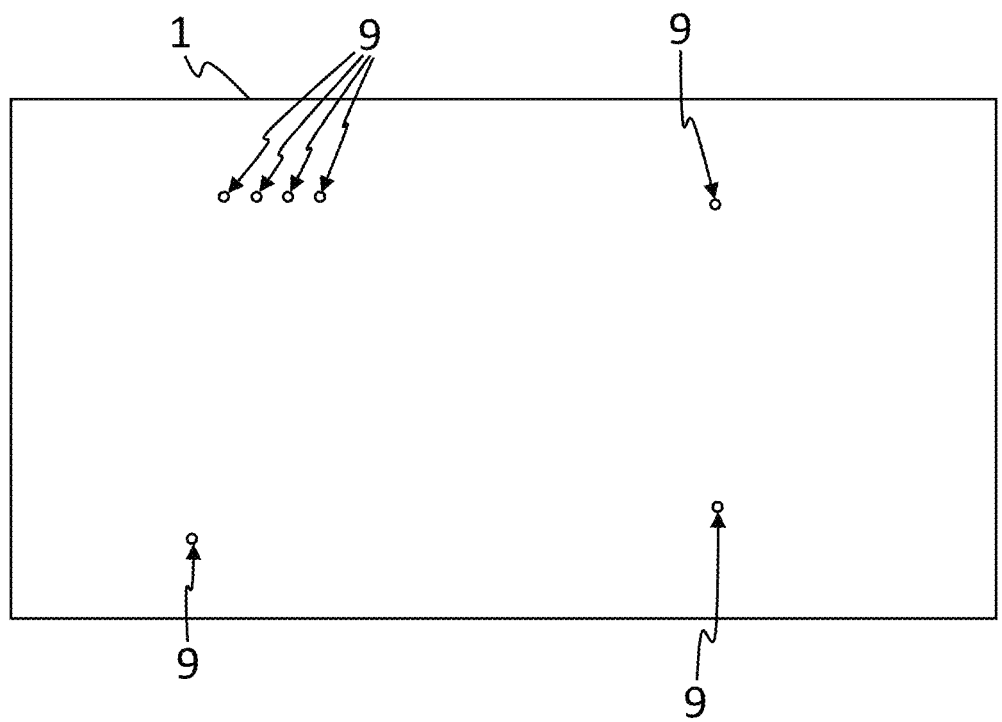
FIG. 13 depicts schematically a glass element according to the disclosure.

After laser treatment as described above, glass element 1 comprising at least one filament-shaped flaw 9 is then transferred to an etching tank 80 as schematically and not drawn to scale depicted in FIG. 3, where glass element 1 is exposed to an etching bath 81 (etching medium 81) which removes material of glass element 1, that is, glassy material or altered glassy material, such as material forming filament-shaped flaw 9, by etching. Etching bath 81 may be an acid etching bath, or else be a basic etching bath. Due to environmental and safety issues, however, a basic etching bath might be preferred. According to the example depicted schematically and not drawn to scale in FIG. 3, glass element 1 comprises a multitude of filament-shaped flaws 9 that are arranged along path 11. However, in general, without being restricted to the example shown in FIG. 3, it is understood that glass element 1 need only comprise a single filament-shaped flaw 9. An example of glass element 1 comprising only a single filament-shaped flaw is shown schematically and not drawn to scale in FIG. 12 in a top view. Further, glass element 1 may comprise a plurality of single filament-shaped flaws 9 distributed over glass element 1, as shown schematically and not drawn to scale in FIG. 13. Further, it is to be noted here that even though FIGS. 2, 12 and 13 show glass elements 1 comprising at least one flaw 9, as the position of flaw or flaws 9 corresponds to the position of a blind hole 91 or a channel 10 obtained via etching, FIGS. 2, 12 and 13 may also be understood to refer to glass elements with holes 91 or channels 10 instead of flaws 9. Further, in case of glass element 1 of FIG. 13, comprising several flaws 9 (or channels or holes), it may be contemplated to arrange flaws 9 in such a way that resulting holes are arranged in a grid or pattern. This may be particularly preferred in case glass element 1 is used as an interposer.

Figure 4:
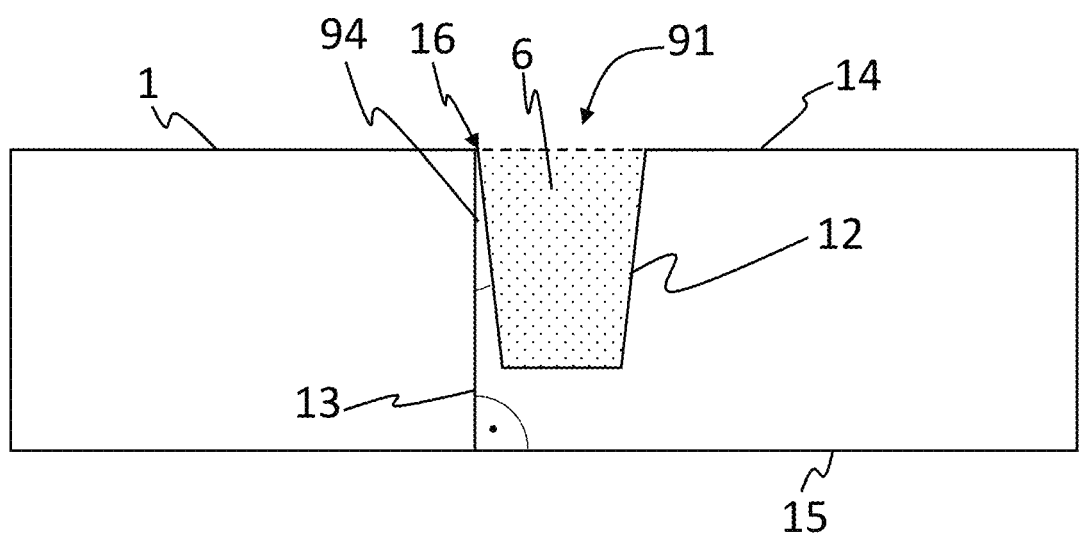
FIG. 4 schematically depicts a filament-shaped flaw according to the disclosure.

By etching, filament-shaped flaw 9 widens to form wall 6, as is depicted schematically and not drawn to scale in FIG. 4. That is, by etching, the material of flaw 9 is more easily removed than the unaltered material of glass element 1, so that by etching, hole 91 is formed corresponding to previous flaw 9, wherein hole 91 has a wall 6. Wall 6 has boundary line 12 that is tapered at vertex 16 between wall 6 and adjacent wall face 14, in the case depicted in FIG. 4. Therefore, taper angle 94 is drawn between perpendicular 13 of side face 14 and wall 6. This taper angle 94 is adjusted by at least one of: the position, the length, and the intensity distribution of the focus line 8. For example, by adjustment of the position and length of the focus line 8, the depth of a filament shaped flaw in the form of a blind hole can be adjusted. As shown in FIG. 4, resulting hole 91 is a blind hole, that is, a hole ending within glass element 1. It is noted here that for the sake of better visibility, the diameter of hole 91 has been exaggerated. Due to etching, hole 91 results, wherein the lateral dimension of hole 91 is smaller towards a bulk region of glass element 1. This is due to the etching bath being altered (or aged) during the etching, such that an etching rate at the surface 14 of glass element 1 is higher than an etching rate in a bulk region.

As an advantage of the method according to the disclosure, by adjusting position and intensity of focus line 8, preferably by aid of a suitable focusing optics 70, taper angle 94 may be controlled and adjusted according to a predefined value in a very simple and efficient way.

A suitable focusing optics 70 may comprise a lens, such as a spheric or aspheric lens, or an axicon, or a spatial light modulator or suitable combinations thereof.

Figure 5:
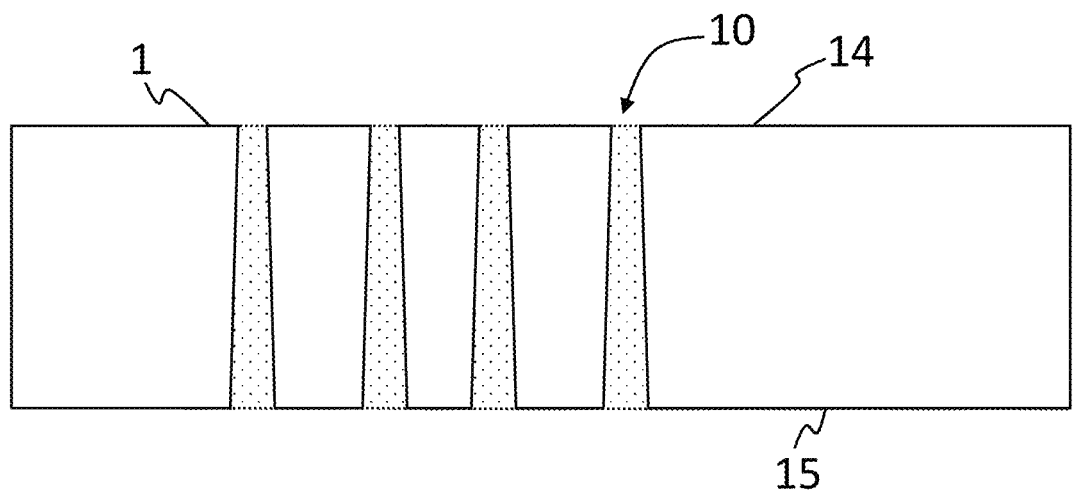
FIG. 5 schematically depicts a channel according to the disclosure.

According to an embodiment as shown schematically and not drawn to scale in FIG. 5, channel (or through hole) 10 is produced by etching and widening of flaw 9, channel 10 opening to both opposite side faces 14, 15 of glass element 1. Such a through hole or channel 10 may be obtained by etching a blind hole that extends from one surface, here surface 15, of glass element 1 and nearly percolates glass element 1. A flaw suited for obtaining a channel as shown in FIG. 5 is, for example, schematically and not drawn to scale depicted as flaw 9f in FIG. 8. Such an embodiment may be favourable in case glass element 1 is used in printed circuit applications. As schematically and not drawn to scale depicted in FIG. 5, a multitude of channels 10 that are distributed over glass element 1 in a predefined pattern may be produced by introducing filament-shaped flaws 9 across glass element 1. Generally, however, without being restricted by the example shown here, it is possible to produce only one channel 10 within glass element 1.

Figures 6A, 6B:
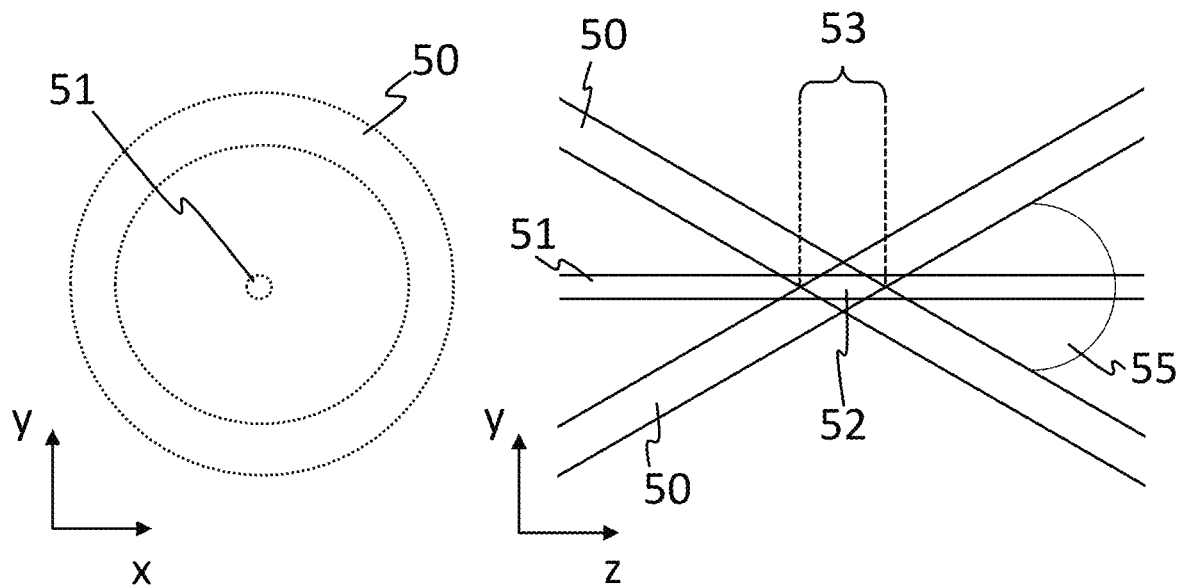

Very advantageously, according to an embodiment, filament-shaped flaw 9 that ends in glass element 1 is produced using focusing optics 70, wherein focusing optics 70 superimposes at least two partial beams 50, 51 of laser beam 5 so that the interference of partial beams 50, 51 generates an intensity variation along focus line 8. In this way, taper angle 94 may be adjusted in a quick and easy manner. FIGS. 6a and 6b schematically depict laser beam 5 comprising two partial beams 50, 51. In FIG. 6a, laser beam 5 is depicted along the beam direction. As can be seen in FIG. 6a, partial beam 51 is a central beam, whereas partial beam 50 is, in the exemplary embodiment of FIG. 5, an annular beam. In FIG. 6b, laser beam 5 in a side view. Partial beams 50, 51 interfere in region 52 with a length 53. In this interference region 52, the filament-shaped flaws may advantageously be produced within glass element 1. It is noted here that according to the exemplary embodiment as depicted in FIGS. 6a-b, annular partial beam 50 may be a Bessel beam or Bessel-Gauß beam. Such partial beams may be created with a suitable focusing optics 70 (not shown here), for example an axicon.

Figure 7:
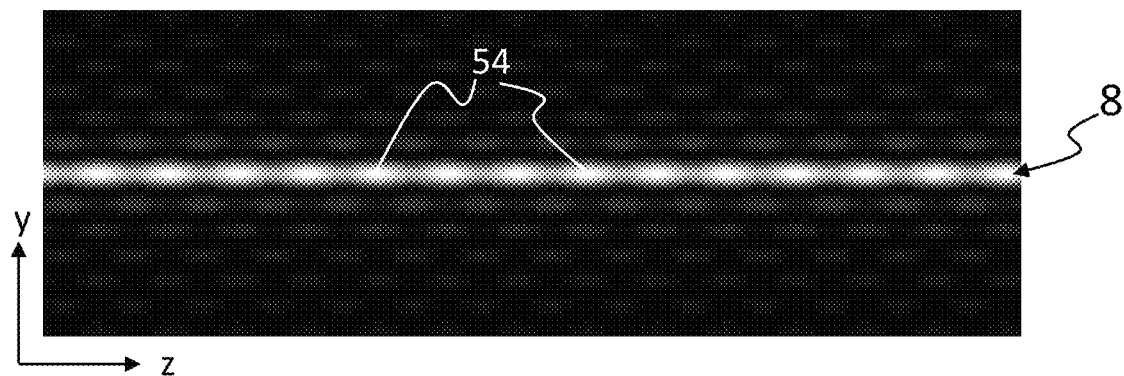
FIG. 7 schematically depicts an intensity distribution along a focus line of the laser beam of FIGS. 6a-6b.

FIG. 7 depicts the intensity distribution along focus line 8 of laser beam 5 according to the embodiment of FIGS. 6a-6b. Along focus line 8, several intensity maxima 54 are induced by interference of partial beams 50, 51.

Figure 8:
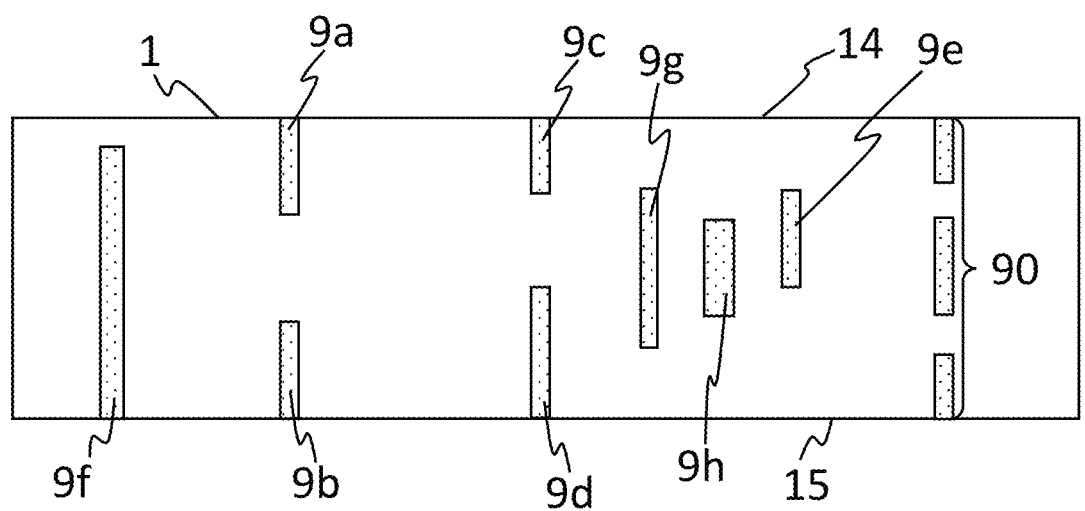
FIG. 8 schematically depicts a flaw suited for obtaining the channel of FIG. 5.

FIG. 8 shows, by way of example, schematically and not drawn to scale different shaped flaws 9 formed within glass element 1 according to embodiments of the disclosure According to an embodiment and as schematically and not drawn to scale depicted in FIG. 8 by way of example, two coaxially oriented filament-shaped flaws 9a, 9b are generated by irradiation of laser beam 5 (not shown). Two coaxially oriented flaws 9a, 9b may, for example, be produced by irradiation glass element 1 at different depths, by using the method of DE 10 2018 126 381 A1 or by a chromatic filamentation method as described in DE 10 2017 208 290 A1. In a chromatic filamentation method, a lens having chromatic aberration is used to focus the laser beam. Using different wavelength bands, the laser beam then can be focused in different depths to generate the coaxially oriented filaments. As suitable laser light source may be a white laser, such as a white fiber laser, or any suitable polychromatic laser may be employed. With such a pulsed polychromatic laser beam, having in particular a certain pulse duration and having certain wavelengths of the laser beam, by means of the optical arrangement having chromatic aberration for wavelength-dependent focusing of the laser beam and having at least one filter for wavelength-dependent filtering of the laser beam, it is possible to produce a focal line along the beam direction of the workpiece, such as a glass element 1 with which the processing depth of the workpiece may be adjusted selectively and accurately. In particular, the length of the focal line may be adjusted by generating different foci. Further, it is also possible to filter polychromatic light so that a suitable wavelength range may be employed. By means of a filter, at least one wavelength of the laser beam may be selectively filtered, so that selectively no focus is formed at least at a particular position in the focal line. In particular, by unilateral or bilateral limiting of the optical spectrum (introduction of a band edge filter, or bandpass filter), it is possible to define a start or end point of the focal line. In a separate embodiment, in particular the endpoint (on the side facing away from the laser) is adjusted in a defined way, for example to avoid processing of a support on which the workpiece is resting.

As depicted in FIG. 8, coaxially oriented flaws 9a, 9b are each starting at opposite end faces 14 and 15 and end vis-à-vis within glass element 1. This may, for example, be accomplished by first irradiating a first side face, for example side face 14, thereby producing a first flaw, and subsequently irradiating the second side face 15, thereby creating a second flaw. However, this requires a very precise control of the element position with respect to that of laser beam 5 in two different process steps, wherein the element position is changed between steps, that is, changing the orientation of side faces 14 and 15 relative to laser 7. Therefore, it might be preferred to use the method according to German patent application DE 10 2018 126 381 A1, which allows to produce both flaws in a single process step. In such a method, for example, a suitable focusing optics 70, such as an axicon (for example an axicon without a tip), may be used. Further, it is possible in this case to select the axicon so that interference angle 55 (depicted in FIGS. 6a-6b) of partial beam 50 may be adjusted. For example, if a Nd:YAG-laser (with an emission wavelength of 1064 nm) is used as laser 7, a periodicity, that is, the distance between maxima 54 of laser beam 5, may be obtained of 10 µm or even less than 10 µm, up to 100 µm or even up to 200 µm. Therefore, the method according to the disclosure is suited for creating holes or channels with tapering walls in very thin glass elements, that is, glass element with a thickness of 1 mm or less, preferably 0.5 mm or less, particularly preferably 300 µm or less, more particularly preferably 200 µm or less, such as 100 µm or less or even 50 µm or less or 30 µm or less. As well, coaxially oriented flaws may be produced by irradiating the laser beam subsequently with different focal positions or focal lengths, respectively.

According to a further embodiment, coaxially oriented flaws 9c, 9d are produced in glass element with each flaw 9c, 9d having a different length so that by etching and widening of filament-shaped flaws 9c, 9d, wall 6 connecting opposite side faces 14, 15 of glass element 1 is formed, wherein a boundary line 12 is formed with different taper angles at the vertices 16, 17, 18, 19 to side faces 14, 15. That is, simple by adjusting the length and/or the position of flaws 9, taper angles 94 may be adjusted. For example, with respect to flaws 9e, 9g, and 9h in FIG. 8, as their positions relative to surfaces 14, 15 of glass element 1 are different, resulting taper angles of holes 91 or channels 10 obtained will be different from each other as a result of etching bath ageing. Therefore, the present invention also relates to a method of producing channels 10 in plate shaped glass element 1, in particular according to any of previously described embodiments, wherein a pulsed laser beam 5 of an ultrashort pulse laser 7 is directed onto glass element 1, wherein glass element 1 is transparent for laser beam 5 and wherein at least one filament-shaped flaw 9 (for example and with respect to FIG. 8, flaw 9g) is produced in the glass element 1, the filament-shaped flaw 9 (here, filament shaped flaw 9g) extending transversely to side faces 14, 15 of glass element 1, the filament-shaped flaw 9 (here flaw 9g) being produced with laser beam 5 that is concentrated by means of focusing optics 70 to form focus line 8 in glass element 1, wherein the intensity of laser beam 5 within focus line 8 is sufficient to produce the filament-shaped flaw 9, and wherein focus line 8 is adjusted so that both ends of filament shaped flaw 9 are positioned within glass element 1. Subsequently, glass element 1 is exposed to etching bath 81 which removes glass by etching, so that so that glass material of the side faces 14, 15 is removed and at least one of the ends of the filament-shaped flaw 9 (here, as pointed out above, flaw 9g) is exposed, and wherein the etching is continued so that the filament shaped flaw 9 is widened to form a channel 10 having a predetermined diameter.

According to an embodiment, at least two filament shaped flaws 9 are introduced into glass element 1, here, in FIG. 8, flaws 9g and 9h. Here, the ends of the filament shaped flaws 9g, 9h have a different distance to one of side faces 14, 15 of glass element 1 so that upon etching one of the filament shaped flaws 9g, 9h, that is, in the exemplary embodiment illustrated in FIG. 8, flaw 9g in this case, is exposed earlier than the other filament shaped flaw, here flaw 9h, so that the flaws 9g, 9h are exposed to etching bath 81 for different time spans so that channels 10 of different diameter are produced.

Further, it may be contemplated to adjust the diameters of flaws 9 generated within glass element 1 according to a predefined value. For example, as can be seen in the schematic and not drawn to scale depiction of FIG. 8, it may be provided to generate flaws 9 with different diameters, which may be achieved by adjusting the laser parameters and/or by irradiating a flaw longer or repeatedly in order to achieve a greater diameter of the resulting flaw.

Figure 9:
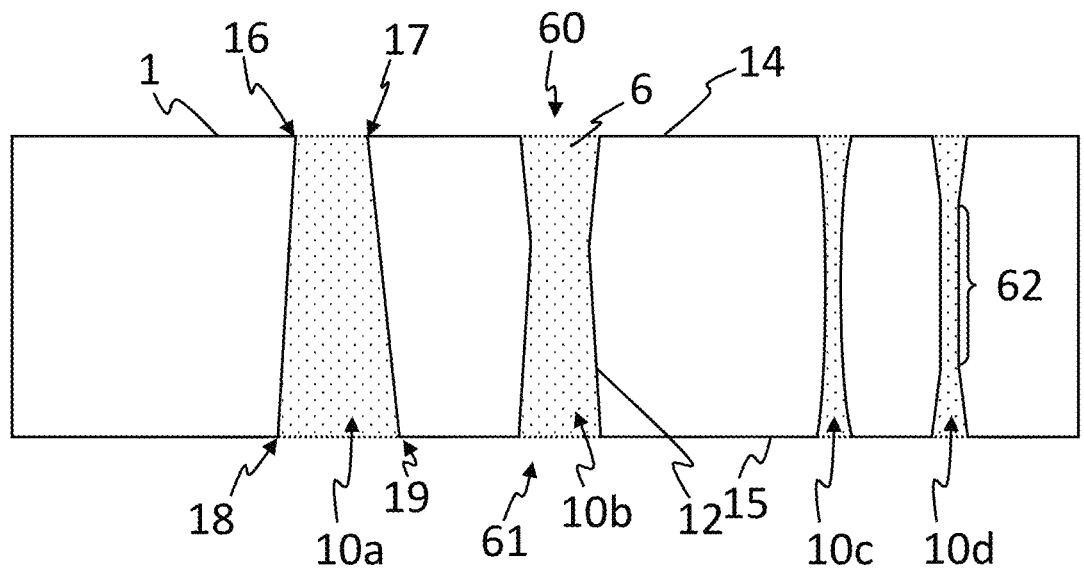
FIG. 9 schematically depicts a plate shaped glass element according to the disclosure.

Furthermore, a channel 10 may be formed in that way, wherein the angles drawn between channel 10 (or rather, boundary lines 12 of wall 6 of channel 10) and side faces 14, 15 differ from each other. Such a glass element 1 comprising channels 10 with different taper angles at different vertices 16, 17, 18, 19 is depicted schematically and not drawn to scale in FIG. 9. In the exemplary plate shaped glass element 1 as shown schematically and not drawn to scale in FIG. 9, three channels 10a, 10b, and 10c all differ from each other with respect to their respective shape and taper angles. For example, boundary line 12 of wall 6 of channel 10a is a straight line, so that channel 10a may also be understood as having the shape of a truncated oblique cone.

Channel 10b has a tilted boundary line 12, that is, the diameter of channel 10b is wider at openings 60, 61, than in a middle region of channel 10b.

The diameter of channel 10c widens towards openings 60, 61, too, however, in contrast to channel 10b, channel 10c has boundary lines 12 that are concavely curved at least at least one section thereof with respect to perpendicular 13 (not indicated here) to side faces 14, 15.

Further, channel 10d has straight portion 62, that is, a portion wherein the wall is in parallel to the perpendicular, whereas close to surfaces 14, 15 of glass element 1, wall 12 tapers, such that the portions of channel 10d between portion 62 and surfaces 14, 15 exhibit a truncated cone-like shape. Such a channel 10d comprising straight portion 62 may, for example, be obtained by etching a series of filament-shaped flaws 9, such as series 90 depicted in FIG. 8.

According to a further embodiment depicted schematically and not drawn to scale in FIG. 8, filament-shaped flaw 9e is produced by irradiation of laser beam 5, wherein flaw 9e starts and ends within glass element 1.

Figure 10:
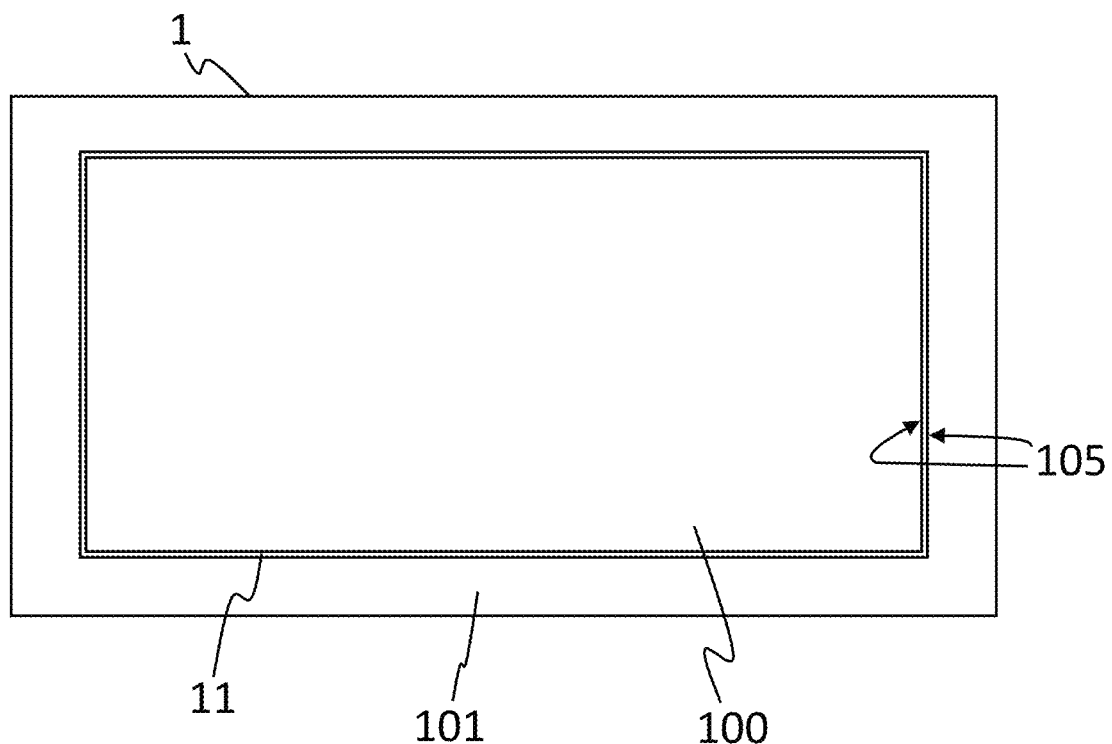
FIG. 10 schematically depicts a glass element according to the disclosure.
Figure 11:
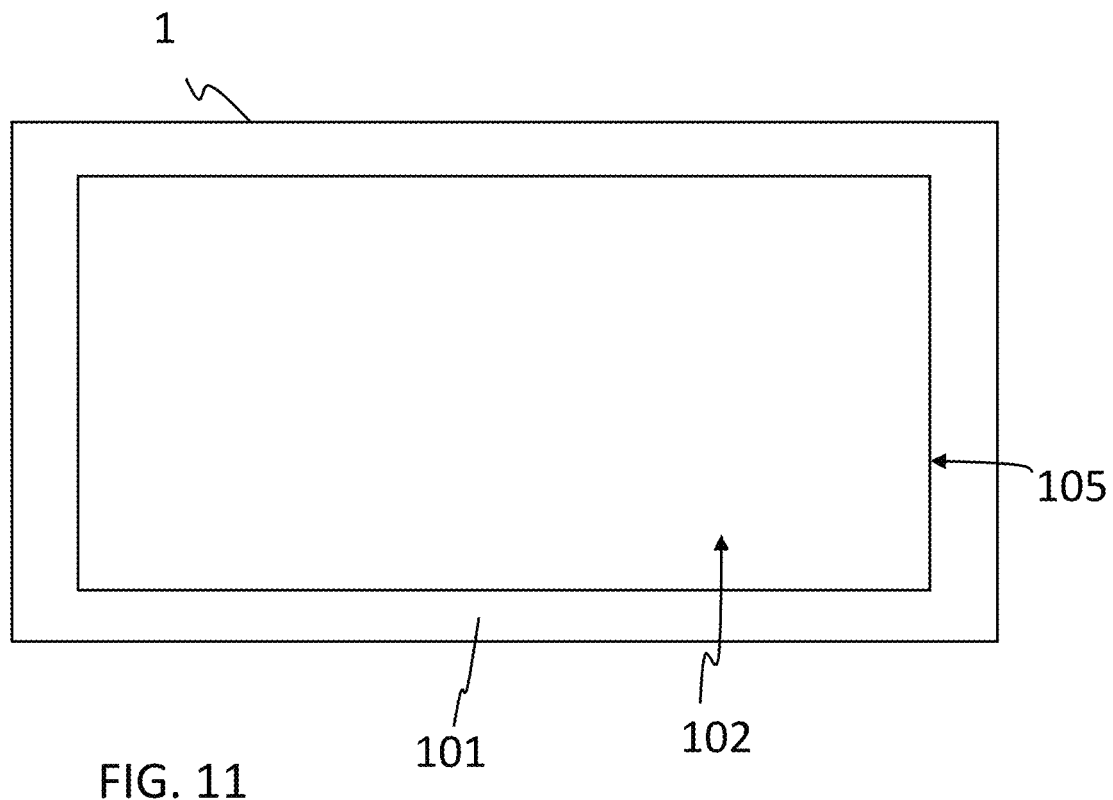
FIG. 11 schematically depicts an outer glass segment according to the disclosure.

According to a further embodiment, laser beam 5 is advanced relative to glass element 1 along predefined path 11. In that way, a multitude of flaws 9 results that are arranged side-by-side along path 11. In that case, etching is continued at least until adjacent channels 10 combine so that glass element 1 is divided into segments 100, 101 (shown schematically and not drawn to scale in FIG. 10) along path 11 and in such a way that walls 6 produced by etching form edge faces 105 of segments 100, 101. Such an embodiment is favourable, as in that way, removal of segments may be achieved much easier, especially in case predefined path 11 is a closed line within glass element 1. Further, resulting edges faces 105 are bevelled, which increases the mechanical strength of segments 100, 101. For due to the etching process, any defects that may deteriorate the glass strength such as microcracks have already been eroded, so that resulting edges faces 105 may be obtained with in a predefined shape and high strength, that is, a higher strength than would be obtained in common cleaving or cutting processes. Therefore, according to a further embodiment, laser beam 5 is guided relative to glass element 1 along a closed path 11 so that by subsequent etching an inner glass segment 100 is parted from outer glass segment 101, leaving an opening 102 in outer glass segment 101. This is schematically and not drawn to scale depicted in FIGS. 10 and 11, FIG. 11 showing outer glass segment 101 with removed inner glass segment 100, thereby leaving opening 102.

According to a further embodiment, taper angle 94 between boundary line 12 of wall 6 and side face 14 and/or 15 is adjusted by selecting the molarity of the etching bath (or etching medium) 81. That is, it is possible to vary the taper angle by careful selection of the etching conditions, in particular, by adjusting the etching bath molarity. Preferably, a basic etching bath (or an etching medium) is used, for example an etching bath (or etching medium) comprising, as main component, KOH. Such an etching bath or etching medium is well suited for etching glasses that are commonly used in technical applications, such as glasses for interposers. Especially, borosilicate glasses may be etched using basic etching bathes (or basic etching media) comprising KOH. In this way, commonly employed acid etching media for glasses, that usually are based on HF or related compounds, need not be employed. This is favourable, as HF comprising and like etching media are harmful, especially with regard to safety and environmental issues.

Preferably, taper angle 94 is adjusted by setting, in particular increasing the basic etching bath molarity (or basic etching medium molarity). This is favourable as in this way, the overall reaction rate is increased.

Generally, the dependence of the taper angle to the molarity of the etching bath allows to produce predefined taper angles. As well, the taper angle may also generally depend on the viscosity of the etching bath and further parameters such as the etching depth or the etch removal. The etch removal depends on the etching time. Thus, in a further embodiment, to achieve a desired taper angle, a refined method is provided comprising the steps: defining a taper angle 94 of the edges of the segments 100, 101 to be achieved after etching; determining at least one of a molarity of the etching bath 81, a viscosity of the etching bath 81, an etch removal and an etching time depending on the defined taper angle 94; preparing an etching batch 81 having a molarity or viscosity as determined; and etching the glass element in the etching bath 81. This way, typically, the taper angle achieved after etching differs from the predefined, or, respectively, desired taper angle by less than 0.5°, preferred by less than 0.3, more preferred by less than 0.2°.

Generally, determining at least one of a molarity and viscosity of the etching bath 81 depending on the defined taper angle 94 may include the extrapolation from one or more reference points or interpolation between one or more reference points relating the taper angle to at least one of the parameters molarity or viscosity of the etching bath. In this regard, it has been found that taper angle 94, for example a taper angle of the edges of segments 100, 101, may be increased by at least 0.1° by increasing the molarity of the basic etching bath or etching medium 81 by 2 mol/l. Thus, the step of determining the molarity may include an extrapolation from one or more reference points using a factor of at least 0.1°/2 mol/l.

According to a further embodiment, taper angle 94, for example taper angle 94 of edges of segments 100, 101, may be increased in a range from 0.3° to 0.7° by increasing the molarity of the etching bath 81 (or etching medium 81) by a value of from 4 mol/l to 8 mol/l, preferably by increasing the molarity of KOH by 6 mol/l. Thus, according to this embodiment, determining the molarity of the etching bath may include the step of increasing the molarity of the etching bath 81 (or etching medium 81) by a value of from 4 mol/l to 8 mol/l, preferably by increasing the molarity of KOH by 6 mol/l to increase the taper angle in a range from 0.3° to 0.7° with respect to a reference point of the molarity and taper angle. Preferably, reference points which may be used according to the above explained embodiments for adjusting the parameters of the etching bath are derived from measurements, i.e., from measured taper angles at glass segments etched in etching baths with known molarity or viscosity. Of course, the values of the one or more reference points may be corrected, e.g., by averaging or linear regression.

Generally, the determination of the molarity or viscosity may be accomplished using a reference function of the taper angle in dependence of the molarity or viscosity. The function returns the molarity or viscosity for the respective taper angle to be achieved. This function may also be represented by a table. For example, the above explained embodiment using a factor of at least 0.1°/2 mol/l in fact uses a linear reference function with a gradient given by this factor. Generally, a reference function may be obtained by a regression, particular a linear regression of multiple measurements, i.e., multiple measured reference points. The factor may even amount to at least 0.2°/(mol/l), e.g., to approximately 0.25°/(mol/l).

Figure 14:
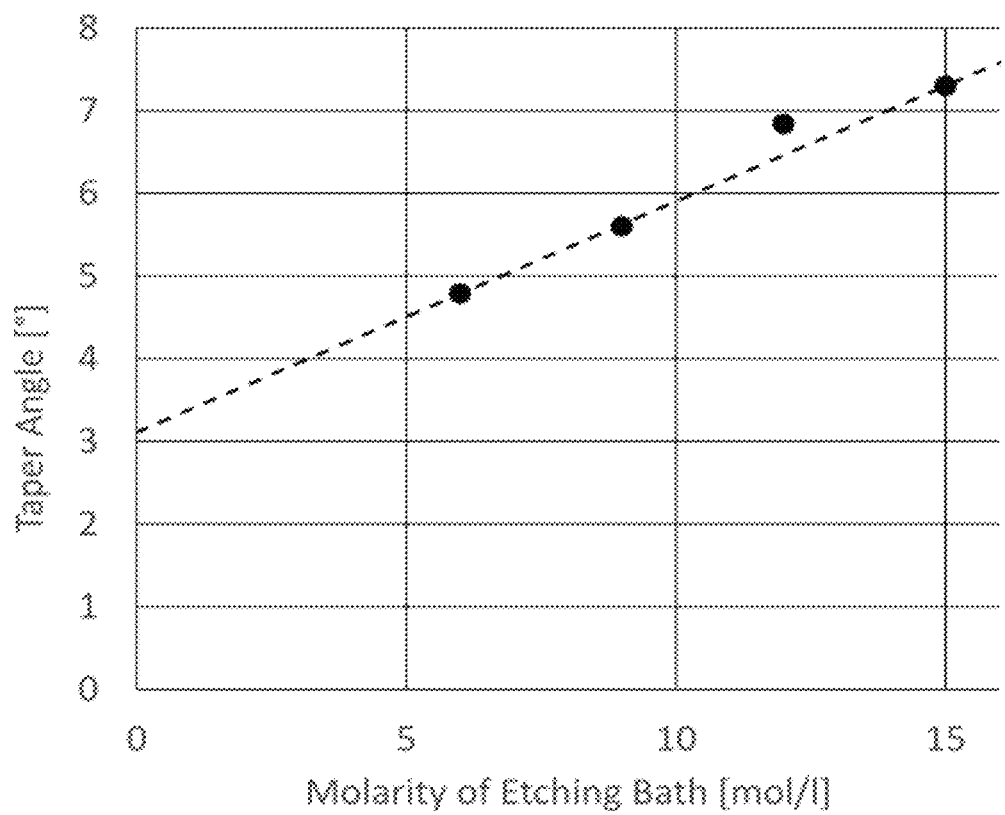
FIG. 14 shows a diagram with four measurements of the taper angle obtained at different molarities of a basic etching bath.

FIG. 14 shows a diagram with four measurements of the taper angle obtained at different molarities of a basic etching bath. The measurements are represented as filled circles. Further, a regression line of the measurements is shown as a dotted line. The regression line can be used as a reference function to determine the molarity of an etching bath to obtain a desired taper angle of the wall between the side faces of the glass element. In fact, the linear regression also represents an extrapolation from one or more reference points or interpolation between one or more reference points relating the taper angle to the molarity of the etching bath.

Figure 15:
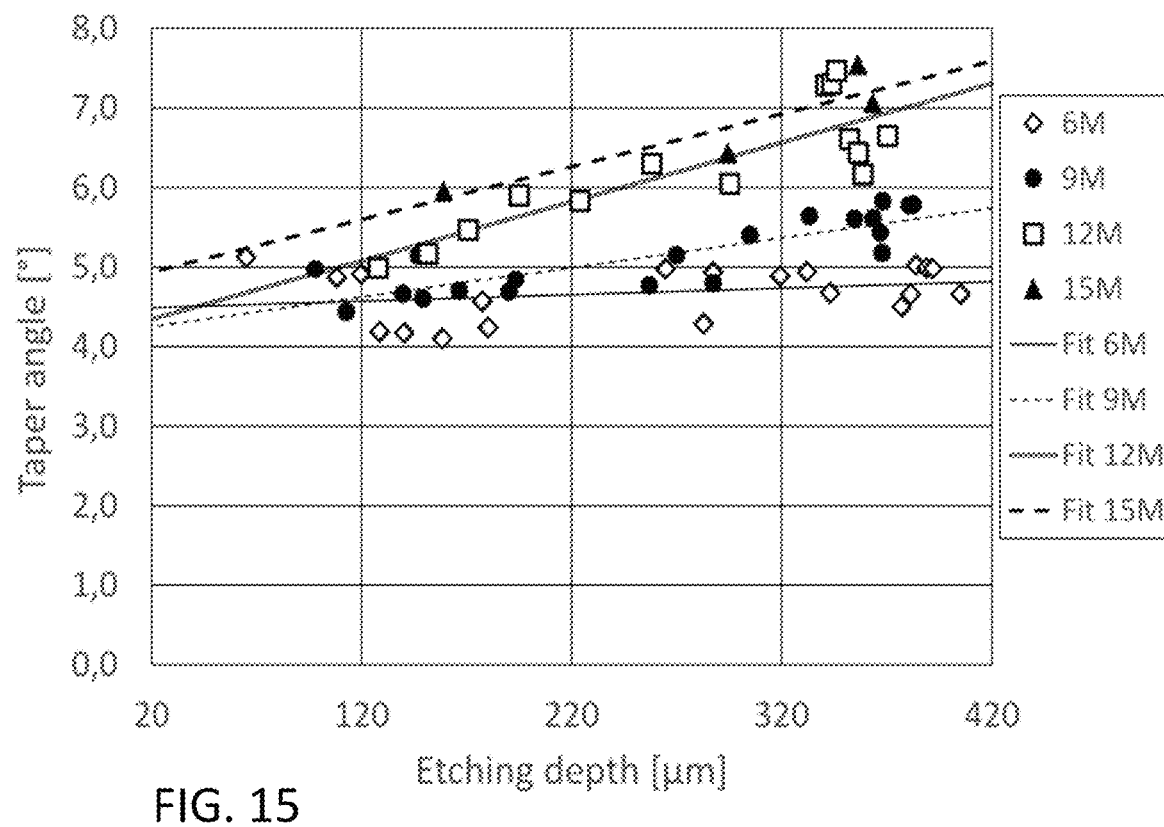
FIG. 15 shows measured values of the taper angle and fitted lines for different etching depths and different molarities.

It is to be understood that there are other parameters which also have an influence on the taper angle. Thus, other adaptations of the etching parameters may be chosen alternatively or additionally to the molarity or viscosity of the etching bath to obtain a desired taper angle. Specifically, as mentioned above, other etching parameters include the etching depth and the etch removal or the etching time which corresponds to the etch removal for a given molarity and temperature may influence the taper angle and therefore can be used to adjust the taper angle to its desired value. Further, the etching depth may be taken into account when adjusting the parameters to achieve a desired taper angle. The etching depth corresponds to the depth of the channels in the glass element and hence to the glass thickness if the filament shaped flaws 9 extend through the whole glass element from one side to the opposite side. FIG. 15 shows measured values of the taper angle and fitted lines for different etching depths and different molarities (i.e., 6, 9, 12 and 15 mol/l as indicated in the legend) of the etching bath 81. As can be seen, the taper angle generally increases both with etching depth and molarity.

Figure 16:
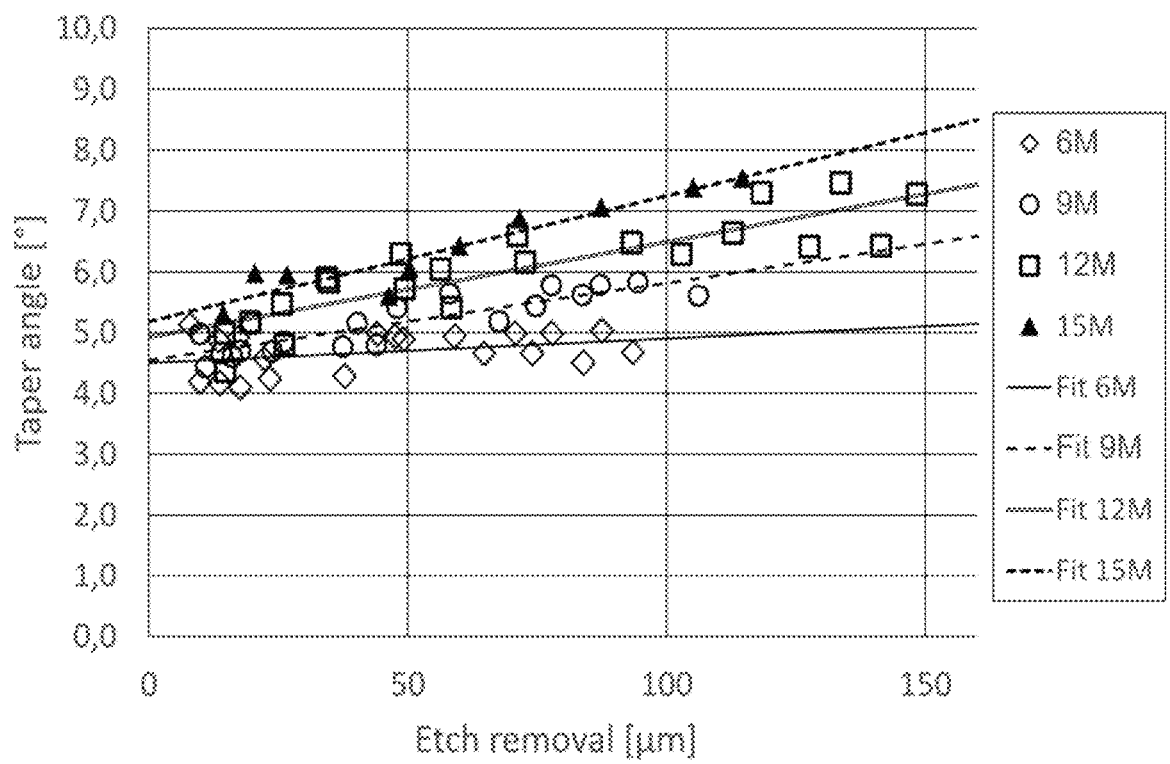
FIG. 16 shows a diagram of values of the taper angle as a function of the etch removal.

Similarly, FIG. 16 shows a diagram of values of the taper angle as a function of the etch removal at the walls formed by widening the filament shaped flaws 9. As in FIG. 15, the etching experiments were carried out at different molarities of the etching bath 81, i.e., at 6, 9, 12 and 15 mol/l. FIG. 16 shows that the taper angle increases both with the etch removal and the molarity of the etching bath 81. Thus, the taper angle may also be adjusted by adjusting the etch removal, or the etching time.

The etching rate and the dependence of the taper angle to the molarity of the etching bath also typically depends on the glass type. The examples disclosed herein with respect to the change of the taper angle with respect to the molarity refer to the glass type D263. However, the ranges given herein may also apply to other glasses. Generally, the changes of the taper angle with the molarity of the etching bath as disclosed herein typically apply to glasses having a content of $SiO_2$ in a range from 30 to 85 weight percent. The present invention is further directed to a plate shaped glass element 1. In particular, plate shaped glass element 1 may be produced or is produced or producible with a method according to embodiments of the present disclosure. FIG. 5 shows by way of example plate-shaped glass element 1 having two opposite side faces 14, 15 and a multitude of etched channels 10. Channels 10 extend through glass element 1 so that walls 6 of channels 10 connect side faces 114, 15. Boundary lines 12 of walls 6 are tapered at vertices 16, 17, 18, 19 between wall 6 and adjacent side faces 14, 15. That is, taper angles 94 (not indicated in FIG. 5) are drawn between wall 6 (or boundary line 12 of wall 6) and perpendicular 13 (not indicated here) of side faces 14, and 15, respectively. Taper angles 94 may be controlled by a method according to embodiments of the disclosure.

Preferably, according to an embodiment, at least taper two taper angles 94 between boundary lines 12 and the perpendicular 13 of side faces 14, 15 differ from each other.

According to a further embodiment, at least one of channels 10 has a wall 6 with boundary line 12 that has different taper angles to the perpendicular 13 of side faces 14, 15 at openings 60, 61 of channel 10 to the respective side faces 14, and 15.

According to a further embodiment, boundary lines 12 of walls 6 at openings 60, 61 of channels 10 of side faces 14, 15 differ from each other.

According to a further embodiment, within at least one section, wall 6 is concavely curved with respect to a direction perpendicular 13 to side faces 14, 15.

According to a further embodiment, a multitude of channels 10 is distributed over glass element 1 in a predefined pattern. For example, the predefined pattern may constitute a grid, or a circle, or a spiral.

According to a further embodiment, glass element 1 has a thickness of at most 200 µm and preferably at least 3 µm, more preferably at least 5 µm and most preferably at least 10 µm.

Such glass elements 1 and/or segments 100, 101 may for example be used in printed circuit applications, microfluidic devices or for liquid lenses.

| LIST OF REFERENCE NUMERALS | |
|---|---|
| 1 | Glass element |
| 5 | Laser beam |
| 6 | Wall |
| 7 | Ultrashort pulse laser, laser |
| 8 | Focus line of laser beam 5 |
| 9, 9a, 9b, 9c, 9d, 9e, 9f, 9g, 9h | Filament-shaped flaw, flaw |
| 90 | Series of flaws |
| 10, 10a, 10b, 10c, 10d | Channel |
| 11 | Path |
| 12 | Boundary line |
| 13 | perpendicular |
| 14, 15 | Side faces of glass element 1 |
| 16, 17, 18, 19 | Vertices |
| 20 | Positioning means |
| 50, 51 | Partial beams of laser 5 |
| 52 | Interference region |
| 53 | Length of interference region |
| 54 | Intensity maximum |
| 55 | Interference angle |
| 60, 61 | Openings of channel 10 |
| 62 | Straight portion of channel 10d |
| 70 | Focussing optics |
| 71 | Computing means |
| 80 | Etching tank |
| 81 | Etching medium, etching bath |
| 91 | Blind hole |
| 94 | Taper angle |
| 100, 101 | Segments of glass element 1 |
| 102 | Opening within segment 100 |
| 105 | Edge of segments 100, 101 |

What is claimed is:

1. A method of structuring a glass element having a first side face and a second side face, comprising:
producing a filament-shaped flaw in the glass element, the filament-shaped flaw extending transversely to first and second side faces of the glass element, wherein the step of producing the filament-shaped flaw comprises:
directing a pulsed laser beam onto the first side face of the glass element, the glass element being transparent for the pulsed laser beam,
focusing, using focusing optics, the pulsed laser beam to form a focus line in the glass element such that the pulsed laser beam has an intensity within the focus line that is sufficient to produce the filament-shaped flaw, and
adjusting the focus line so that the filament-shaped flaw ends within the glass element;
etching to remove glass in the filament-shaped flaw to form a wall extending from the first side face towards the second side face, the wall having a boundary line that is tapered at a vertex between the wall and the first side face with a taper angle with respect to a perpendicular of the first side face; and
adjusting the taper angle by controlling a feature of the focus line, the feature being selected from a group consisting of a position of the focus line, a length of the focus line between the first and second side faces, an intensity distribution of the focus line, and any combinations thereof, wherein the etching step further comprises selecting a feature of an etching bath to adjust the taper angle, wherein the feature is selected from a group consisting of a molarity of the etching bath, a viscosity of the etching bath, an etch time, and any combinations thereof.

2. The method of claim 1, wherein the etching step further comprises etching to remove glass in the filament-shaped flaw until a channel is formed that is open to the first and second side faces.

3. The method of claim 2, further comprising:
advancing the pulsed laser beam with respect to the glass element; and
repeating the producing, etching, and adjusting steps to form a multitude channels that are distributed over the glass element in a predefined pattern.

4. The method of claim 3, wherein the etching step comprises etching until adjacent channels combine so that the glass element is divided into segments along the predetermined pattern.

5. The method of claim 4, wherein the walls forming edge faces of the segments.

6. The method of claim 4, wherein the predefined pattern is a closed path such that one segment is an inner glass segment and another segment is an outer glass segment and such that division of the inner glass segment leaves an opening in the outer glass segment.

7. The method of claim 1, wherein the focusing step comprises superimposing, using the focusing optics, two partial beams of the pulsed laser beam so that an interference of the two partial beams generates an intensity variation along the focus line.

8. The method of claim 1, further comprising producing a second filament-shaped flaw in the glass element, the second filament-shaped flaw extending transversely to first and second side faces of the glass element, wherein the step of producing the second filament-shaped flaw comprises directing a second pulsed laser beam onto the second side face of the glass element, the glass element being transparent for the second pulsed laser beam, wherein the second filament-shaped flaw is coaxial to the filament-shaped flaw and ends in the glass element.

9. The method of claim 8, wherein the filament-shaped flaw is closer to the first side face earlier than the second filament-shaped flaw is to the second side face, wherein the etching step comprises etching in an etching bath such that the filament-shaped flaw is exposed to the etching bath for longer than the second filament-shaped flaw is exposed to the etching bath.

10. The method of claim 8, wherein the second filament-shaped flaw has a different length than the filament-shaped flaw.

11. The method of claim 10, wherein the etching step further comprises:
etching to remove glass in the second filament-shaped flaw to form a second wall extending from the second side face towards the first side face, the second wall having a second boundary line that is tapered at a second vertex between the second wall and the second side face with a second taper angle with respect to a perpendicular of the second side face.

12. The method of claim 11, wherein the second taper angle is different than the taper angle.

13. The method of claim 1, wherein the etching step further comprises selecting a molarity of an etching bath to adjust the taper angle.

14. The method of claim 13, wherein the etching bath is a basic etching bath.

15. The method of claim 1, wherein the step of selecting the feature comprises a step selected from a group consisting of: determining the molarity based on an extrapolation from one or more reference points; determining the viscosity based on an extrapolation from one or more reference points; determining the molarity based on an interpolation from one or more reference points; determining the viscosity based on an interpolation from one or more reference points; determining the molarity based on a reference function of the taper angle in dependence of the molarity; determining the viscosity based on a reference function of the taper angle in dependence of the viscosity; determining the molarity based on an extrapolation from one or more reference points using a factor of at least 0.1°/2 mol/l; and any combinations thereof.

16. The method of claim 1, wherein the etching step further comprises selecting a molarity of an etching bath to adjust the taper angle, wherein the taper angle is increased in a range from 0.3° to 0.7° by increasing the molarity of the etching bath by a value of from 4 mol/l to 8 mol/l.

17. The method of claim 1, wherein the adjusting step comprises adjusting the focus line so that both ends of the filament-shaped flaw are within the glass element.

18. The method of claim 17, wherein the etching step comprises etching to remove glass from the first and/or or second side faces so that at least one of the ends of the filament-shaped flaw is exposed.

19. The method of claim 18, wherein the etching step further comprises etching to remove glass from the filament-shaped flaw so as to widen the filament-shaped flaw until a channel with a predetermined diameter is formed.

20. A method of structuring a glass element having a first side face and a second side face, comprising:
   producing a filament-shaped flaw in the glass element, the filament-shaped flaw extending transversely to first and second side faces of the glass element, wherein the step of producing the filament-shaped flaw comprises:
      directing a pulsed laser beam onto the first side face of the glass element, the glass element being transparent for the pulsed laser beam,
      focusing, using focusing optics, the pulsed laser beam to form a focus line in the glass element such that the pulsed laser beam has an intensity within the focus line that is sufficient to produce the filament-shaped flaw, and
      adjusting the focus line so that the filament-shaped flaw ends within the glass element;
   etching to remove glass in the filament-shaped flaw to form a wall extending from the first side face towards the second side face, the wall having a boundary line that is tapered at a vertex between the wall and the first side face with a taper angle with respect to a perpendicular of the first side face; and
   adjusting the taper angle by controlling a feature of the focus line, the feature being selected from a group consisting of a position of the focus line, a length of the focus line between the first and second side faces, an intensity distribution of the focus line, and any combinations thereof, wherein the etching step further comprises selecting a molarity of an etching bath to adjust the taper angle.

21. The method of claim 20, wherein the etching bath is a basic etching bath.

22. A method of structuring a glass element having a first side face and a second side face, comprising:
   producing a filament-shaped flaw in the glass element, the filament-shaped flaw extending transversely to first and second side faces of the glass element, wherein the step of producing the filament-shaped flaw comprises:
      directing a pulsed laser beam onto the first side face of the glass element, the glass element being transparent for the pulsed laser beam,
      focusing, using focusing optics, the pulsed laser beam to form a focus line in the glass element such that the pulsed laser beam has an intensity within the focus line that is sufficient to produce the filament-shaped flaw, and
      adjusting the focus line so that the filament-shaped flaw ends within the glass element;
   etching to remove glass in the filament-shaped flaw to form a wall extending from the first side face towards the second side face, the wall having a boundary line that is tapered at a vertex between the wall and the first side face with a taper angle with respect to a perpendicular of the first side face; and
   adjusting the taper angle by controlling a feature of the focus line, the feature being selected from a group consisting of a position of the focus line, a length of the focus line between the first and second side faces, an intensity distribution of the focus line, and any combinations thereof, wherein the etching step further comprises selecting a molarity of an etching bath to adjust the taper angle, wherein the taper angle is increased in a range from 0.3° to 0.7° by increasing the molarity of the etching bath by a value of from 4 mol/l to 8 mol/l.

* * * * *